Aug. 2, 1932.   H. L. BUMBAUGH   1,869,661
LIGHTNING PROTECTION SYSTEM AND METHOD
Filed July 26, 1927   2 Sheets-Sheet 2
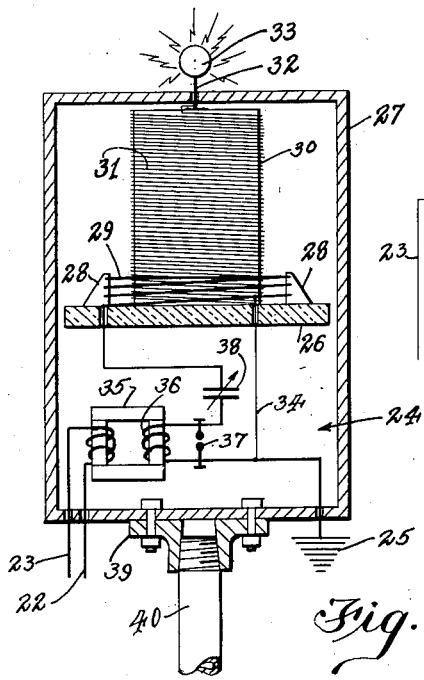
Fig. 6.
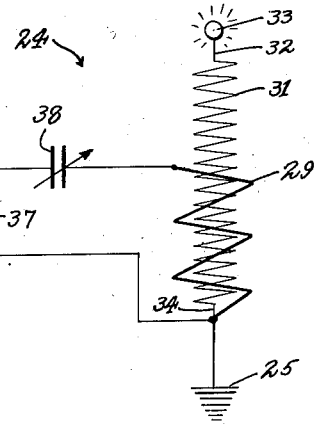
Fig. 7.
Fig. 8.
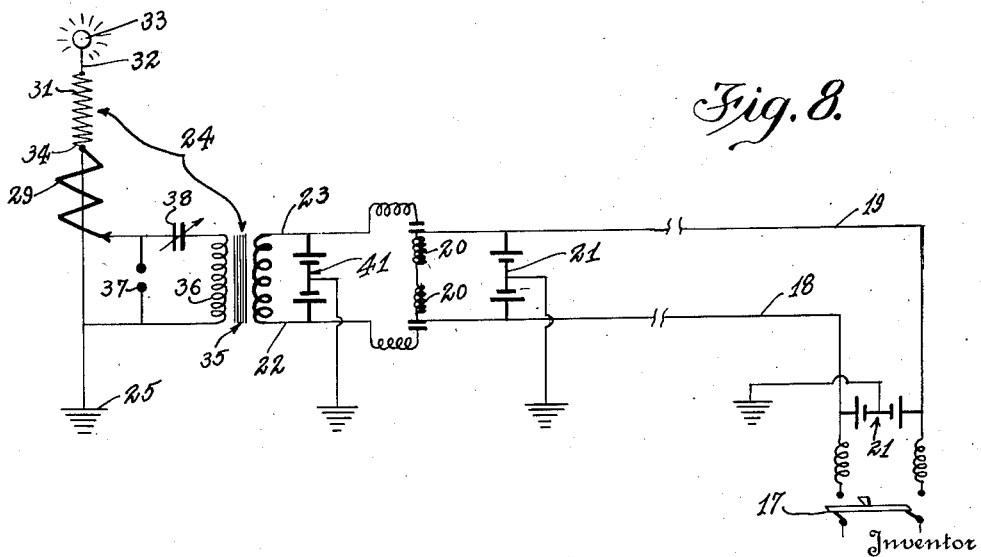
Inventor
Harold L. Bumbaugh
By Lyon & Lyon
Attorneys Patented Aug. 2, 1932

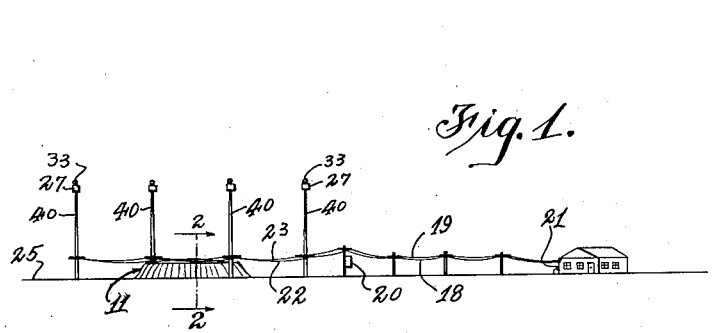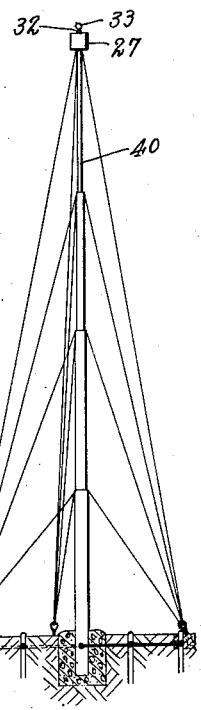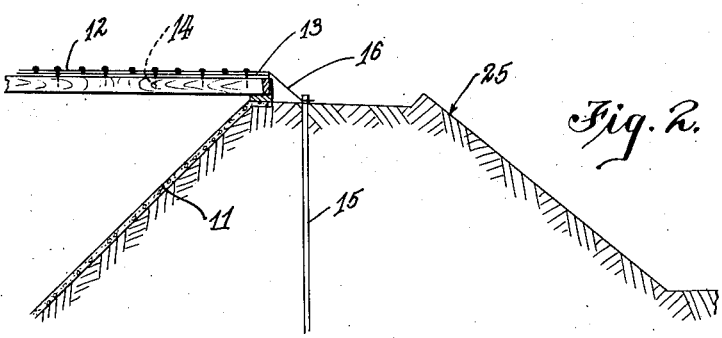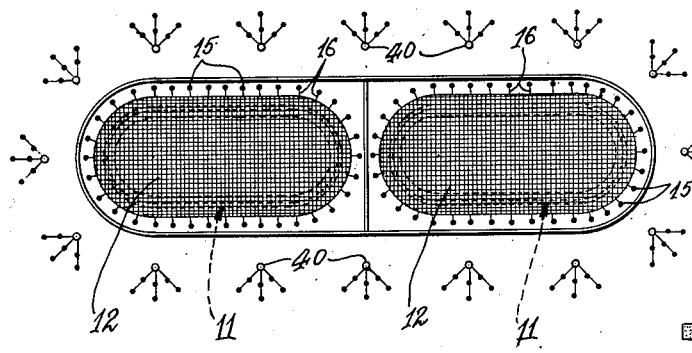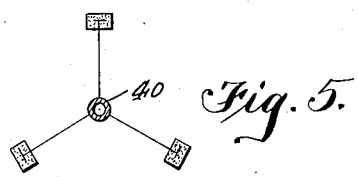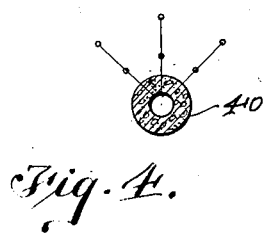

1,869,661

UNITED STATES PATENT OFFICE

HAROLD L. BUMBAUGH, OF SAN FRANCISCO, CALIFORNIA, ASSIGNOR TO STANDARD OIL COMPANY OF CALIFORNIA, OF SAN FRANCISCO, CALIFORNIA, A CORPORATION OF DELAWARE

LIGHTNING PROTECTION SYSTEM AND METHOD

Application filed July 26, 1927. Serial No. 208,536.

This invention relates to lightning protection systems and, also, to lightning protection methods.

In general, an object of the invention is to protect particular areas or structures against being struck by lightning.

More particularly, an object of the invention is to provide a system and method whereby the point or points for receiving the lightning strokes are predetermined.

Another object is to make provision for taking care of the consequential secondary discharges.

Heretofore, it has been a practice for protecting certain areas and structures from lightning strokes, to provide towers, masts and network, singly or enclosing said areas or structures, thus providing a multiplicity of points in the expectation that one or more of said points would receive the lightning stroke in event of the stroke occurring in the vicinity of the area or structure thus protected, thus diverting the lightning stroke from said area or structure. Protection against lightning might possibly be afforded in this manner if it were practicable to erect towers in sufficient number and of sufficient height or to provide metallic enclosures of a type that would insure immunity for the enclosed area or structure against lightning strokes. This, however, is not, generally, feasible economically. Accordingly, another object of the present invention is to afford adequate protection in an economical and practicable manner.

In order to more clearly understand the invention, let it be assumed that there is a cloud sufficiently charged with electricity at a considerable height above the earth, imposing by its influence, an equal charge of electricity of opposite sign on the earth. The result will be a potential difference between the cloud and the earth, the presence of which is manifested in the form of an electrostatic atmospheric potential gradient. As a further result, there will be tendency toward equalization of this potential gradient through the medium of whatever conduction may exist across or through the dielectric or dielectrics separating the charged bodies which, in this instance, are the cloud and the earth.

As the cloud approaches the earth, or as the charge on the cloud increases, the potential gradient becomes steeper and the air intervening between the cloud and the earth becomes subjected to a greater electrostatic stress. The greater this stress the greater will be the tendency of the dielectric to break down and become to a greater or less degree conductive of electric current. In this case, conductivity is primarily due to ionization, probably the ionization of collision, when electrons are pulled from the atoms of the dielectric by the more or less intense strain exerted by the potential gradient. The theoretical explanation of what occurs implies a breaking up of the atoms of the dielectric into electrons and protons which, under the influence of the potential gradient, are drawn, respectively, toward the positively charged body and the negatively charged body.

Other factors being equal, the conduction across a stratum of air will be in direct ratio to the degree of ionization which, in turn, is largely dependent on the potential gradient. Therefore, when two electrically charged bodies of opposite sign exist and there is a tendency toward equalization of potential between them, under such conditions a reduction in the potential difference may take the form of a visible phenomena, when the so-termed ionization potential of the dielectric has been reached. This will be visibly indicated by the formation of corona and under slightly higher potentials, by the formation of streamers, these manifestations generally preceding a more or less complete breakdown of the dielectric, particularly under conditions of increasing or extremely high potential gradient. Under these conditions it is probable that the ionization of collision is supplemented by ionization due to increase in temperature, since the increased molecular activity causes more electrons to give up their energy in the form of heat which results from collision. The effects are undoubtedly cumulative when the potential gradient is sufficiently high.

The rate at which equalization of potential occurs between an electrically charged cloud and the earth depends on the steepness of the potential gradient and the character of the dielectric and, under a sufficiently steep potential gradient, every projecting point on the surface of the earth, such as blades of grass and leaves on the trees, in the vicinity, will have an electric discharge ranging from an infinitesimal amount to an amount that results in visible corona and streamers. If the cloud attains sufficient electric charge and has sufficient capacity, to make it a potential source of lightning strokes, some path of ionization or breakdown of the dielectric may occur between the cloud and the earth and along this highly conducting path, the current flow which constitutes a lightning stroke will take place. The earth end of this path of ionization will be at some point which, under the existing potential gradient, has a greater discharge, or ionizing influence, than any other nearby point. This is because the power of ionization is the result of the introduction into the space under stress of a number of free electrons (created through ionization) with a consequent tendency to render that particular portion of the space relatively conducting by moving under the influence of the potential gradient and tending to leave a more or less ionized path, and, therefore, one that is more or less conducting of electric current. It follows from this that the ground point first furnishing ionization or electrons in sufficient degree, will be the point from which the path of ionization will start and, if the path of ionization be then completed to the charged cloud, said point will be the one where lightning will strike the earth, all other conditions being the same.

In nature, there are so many variables which influence the behavior and occurrence of lightning strokes that it is manifestly impossible to predetermine and locate every danger point with a view toward avoiding the hazard at said point and in the area adjacent to said point. It is an object of the present invention to artificially create, at will, and at any desired point, an ionized area corresponding to the ionized area at the earth end or point of the lightning stroke so that, by locating this point removed from a particular structure or area, the same will be protected or rendered immune against lightning discharges, any discharge in that particular area being taken by the specially prepared point.

The potential of metallic objects or bodies on the earth is that of the earth and, under the influence of electrical disturbances, a considerable electric charge may be carried to a point considerably above the surface of the earth. As long as the potential gradient remains unchanged, this elevated charge will be in equilibrium and, accordingly, no hazard is present from such conditions; but, in the event of a sudden change in the potential gradient following a lightning discharge, there is a tremendous surge of current from the metallic objects or bodies to the earth. This surge is composed of the elevated charges, the potential of which, when the gradient is reduced, is above that of the earth. If an unbroken path, such as is formed by a metallic conductor of ample capacity, exists from the elevated charges to the earth, the charges, suddenly released, are carried harmlessly to the earth along said path and the electrical equilibrium is again restored. However, any break in the conducting path or lack of capacity of the metallic conductor to properly take care of the current flow will result in a bridging of the gap, resulting from the break in the conductor, by the electric current and the consequent formation of an arc across said gap, thus producing a serious fire hazard.

These electric charges, which take up their position under the stress of a potential gradient are known as bound charges and, when released, following lightning strokes, constitute secondary electric surges which are particularly hazardous in the presence of inflammable liquids and gases. The roof of a reservoir or tank used for the storage of petroleum is a typical example of hazard due to secondary electric discharges or surges. Accordingly, it is an object of this invention to provide a path of electric current conductive material of a capacity to handle the maximum surges to the earth and to make this path a part of the structure to be protected.

In the system I at present propose to employ, there is an electric device for producing corona, brush, streamer, or other high frequency discharges from the top of suitable towers, masts or other elevated structures grounded to the earth, to provide a path along which lightning discharges will flow, and included in the system is a grounded metallic network or grid having a capacity sufficient to relieve the area or structure being protected from any bound electrical charge released by a sudden decrease in the atmospheric potential gradient, such as may follow a stroke of lightning in the vicinity of said area or structure. This grounded metallic network is in all instances placed directly on the surface of and in contact with any roof, tank roof, reservoir roof or other structure which may under a high gradient be the seat of bound charges which upon release may form a secondary surge to ground.

The accompanying drawings illustrate a system constructed in accordance with the provisions of this invention and capable of operating to perform the method in accordance with the invention, the drawings being more or less diagrammatic.

Figure 1 is a view of a lightning protection system embodying the invention.

Figure 2 is an enlarged view, mainly in section, from the line indicated by 2—2, Figure 1.

Figure 3 is an enlarged plan view of the left portion of Figure 1 showing the reservoir and the elements adjacent thereto.

Figure 4 is a plan showing in detail the base of one of the masts, together with the guy wires and grounding wires.

Figure 5 is a plan view of one of the masts, together with its guy wires and the anchors for said wires, the mast being shown in section.

Figure 6 is an enlarged view of the ionizing apparatus, the housing being shown in section.

Figure 7 is a wiring diagram of the wiring of the ionizing apparatus.

Figure 8 is a diagram of electrical connections.

Referring to the drawings, the area or structure to be protected against lightning strokes may be, for example, a tank farm of the character used for the storage of petroleum and its products. In Figure 3, two tanks or reservoirs of such tank farm are indicated at 11 and on each of them is a metallic network or grid 12 for conducting to ground the bound charges that may exist on the reservoir roof. As indicated in Figure 2 the grids 12 may be metallically bonded to the reservoir roofs 13 as indicated at 14 so that, under the influence of an unbalanced potential, any secondary electrical discharges will be carried to the earth, without arcing, by grounds 15 from the grids. Said grounds may be pipes. The grids are connected to the pipes by wires 16.

Now referring, more particularly, to Figure 8, there is provided a manually controlled switch 17 connecting with a source of commercial or other electric current, preferably at a location that is remote from the area and structure that are to be protected. The manually operated switch 17 is connected by wires 18, 19 to remote control switches 20. 21 indicates a line protector for grounding transients and lightning surges that may occur in the wires 18, 19. The remote control switches 20 are connected by wires 22, 23 to a high frequency, high voltage generator or resonance coil 24 which, when in operation, produces the electrical discharge for ionization. The generator 24 is grounded at 25 to the earth so that lightning discharges will be conducted to the earth.

In Figure 8 but one resonance coil or generator 24 is indicated, but, preferably, the upper end of each mast 40 will be provided with such coil or generator and this comprises a portion of the ionization apparatus which is illustrated, more or less diagrammatically in toto in Figure 6. Referring more particularly to said Figure 6 there is provided a base 26 mounted in a housing 27. The base 26 is of suitable electrical insulating material such as hard rubber, bakelite or the like. Mounted on the base 26 is a support 28 for primary winding 29. Also mounted on the base 26 is a cylinder 30 of suitable insulating material, such as hard rubber, bakelite or the like, and on said cylinder is a secondary winding 31. Connected to one end of the secondary winding 31 and projecting through the top of the housing 27 into the atmosphere is a vertical metal rod 32. The rod 32 is surmounted by a metal ball 33. The other end of the secondary winding 31 is connected to a point on the primary winding 29 and the secondary winding 31 is connected by a wire 34 to the ground 25 hereinbefore mentioned. Mounted in the housing 27 is a line-voltage transformer 35. The secondary winding 36 of the transmitter 35 connects with a spark gap 37 and also connects with the ground 25 and with a variable condenser 38 which, in turn, connects with the primary winding 29.

The housing 27 is constructed of suitable weather proof material and covers all elements of the ionizing apparatus excepting the ball 33 and a portion of the rod 32 and the housing may be connected to the mast, with which it is associated, by a pipe flange 39 which is secured to the bottom of the housing and which is threaded on to the upper end of the mast.

The above described system operates to perform the various operations of the method, as follows: Assuming that there are indications of an approaching storm or that a storm may eventually occur in the area or near the structure to be protected, the manually operated switch 17 will be closed, thus energizing the lines 18, 19 so as to operate the remote control switches 20. This connects the ionization apparatus with the source of power and renders the system operative for producing the desired effect on lightning discharges. The high frequency, high voltage generator operates to produce sufficient free electrons adjacent the ball 33 to insure that, if a path of ionization is even completed from the earth to a cloud in that area, the earth end of that path will be in the ionized zone surrounding the ball 33.

It is to be understood that the remote control switches may be dispensed with and the system put into and out of operative condition by manually operated switch or switches at the base of the mast or other supporting structure.

It is to be understood that the system above described may be modified in any suitable manner to suit local conditions.

It will appear from the foregoing that the methhod of protecting an area or structure against lightning involves the operation of producing a definite zone of relatively high ionization at a point or points removed from the area that is to be protected. The method also includes the operation of conducting to the earth from any elevated objects that may be in the protected area, the secondary electrical surge resulting from a lightning discharge in the vicinity.

It is to be particularly noted that in this system the metallic grid or network lies directly on the structure that is to be protected with no dielectric separating the grid and structure. Consequently, when the grid drains the charges to ground, following a lightning discharge in the vicinity, it drains from the structure to ground charges on the structure and, therefore, no fire hazard can exist there.

I claim:

1. The combination with a reservoir for inflammable substances, of a metallic grid in contact with and extending over said reservoir and electrically connected with the earth, an elevated structure at one side of the reservoir, and a means mounted on the elevated structure operable to artificially produce a higher ionized zone above the level of the grid than is producible in said zone by the natural charged condition of the earth, the last mentioned means being electrically connected with the earth.

2. The combination with a reservoir for inflammable substances, of a metallic grid resting on the roof of said reservoir in contact with and bonded thereto, means for electrically connecting the metallic grid with the earth, and means for artificially producing a measurably higher ionized zone at a point removed from the grid than is producible in said zone by the natural charged condition of the earth, the last mentioned means being electrically connected with the earth.

Signed at Ventura, Calif., this 5th day of July, 1927.

HAROLD L. BUMBAUGH.